United States Patent
Kang et al.

(10) Patent No.: US 11,768,499 B2
(45) Date of Patent: Sep. 26, 2023

(54) METHOD FOR GENERATING INTERSECTION POINT PATTERN RECOGNITION MODEL USING SENSOR DATA OF MOBILE ROBOT AND INTERSECTION POINT PATTERN RECOGNITION SYSTEM

(71) Applicant: DAEGU GYEONGBUK INSTITUTE OF SCIENCE AND TECHNOLOGY, Daegu (KR)

(72) Inventors: Tae Hun Kang, Daegu (KR); Jung Hyun Chu, Daegu (KR); Sung Gil Wee, Daegu (KR); Dae Han Hong, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 86 days.

(21) Appl. No.: 17/607,941

(22) PCT Filed: May 7, 2020

(86) PCT No.: PCT/KR2020/006019
§ 371 (c)(1),
(2) Date: Nov. 1, 2021

(87) PCT Pub. No.: WO2020/231080
PCT Pub. Date: Nov. 19, 2020

(65) Prior Publication Data
US 2022/0326715 A1 Oct. 13, 2022

(30) Foreign Application Priority Data
May 10, 2019 (KR) ........................ 10-2019-0055159

(51) Int. Cl.
*G05D 1/02* (2020.01)

(52) U.S. Cl.
CPC ......... *G05D 1/0221* (2013.01); *G05D 1/0274* (2013.01); *G05D 2201/0216* (2013.01)

(58) Field of Classification Search
CPC .. G05D 1/0221; G05D 1/0274; G05D 1/0276; G05D 2201/0216; G05D 1/0263;
(Continued)

(56) References Cited

U.S. PATENT DOCUMENTS

| 6,108,597 A | * | 8/2000 | Kirchner | G05D 1/0274 |
| | | | | 701/25 |
| 8,849,559 B2 | | 9/2014 | Jeong et al. | |

(Continued)

FOREIGN PATENT DOCUMENTS

| JP | 2004340930 | 12/2004 |
| JP | 2010190897 | 9/2010 |

(Continued)

OTHER PUBLICATIONS

KIPO, Decision to Grant a Patent of KR 10-2019-0055159 dated Jan. 14, 2021.
KIPO, Office Action of KR 10-2019-0055159 dated Aug. 21, 2020.

*Primary Examiner* — Bao Long T Nguyen
(74) *Attorney, Agent, or Firm* — LEX IP MEISTER, PLLC

(57) ABSTRACT

One embodiment of the present invention provides an intersection point pattern recognition system using sensor data of a mobile robot, comprising: a mobile robot that autonomously drives by using sensor data received from a sensor unit and an intersection point pattern recognition model provided by a management server; and the management server that receives usage environment information of the mobile robot and generates the intersection point pattern recognition model of the mobile robot to provide the intersection pattern recognition model to the mobile robot, wherein the management server comprises: a map generation unit for receiving the usage environment information of the mobile robot and generating a route map of the mobile robot on the basis of the usage environment information; a normalization unit for generating a virtual map by normalizing the route map according to a preset rule; and a learning unit for generating the intersection point pattern recognition model by using the virtual map and the sensor data of the mobile robot as learning data.

10 Claims, 11 Drawing Sheets

(58) Field of Classification Search
CPC .. G05D 1/0282; G05D 1/0268; G05D 1/0234; B25J 9/16; B25J 9/1664; B25J 9/1694; Y10S 901/01

See application file for complete search history.

(56) References Cited

U.S. PATENT DOCUMENTS

| | | | |
|---|---|---|---|
| 10,414,395 B1* | 9/2019 | Sapp | G08G 1/00 |
| 10,579,058 B2 | 3/2020 | Oh et al. | |
| 2010/0211244 A1* | 8/2010 | Jeong | G06T 19/003 |
| | | | 701/25 |
| 2017/0192436 A1* | 7/2017 | Min | G01C 21/34 |
| 2018/0164812 A1* | 6/2018 | Oh | G06N 3/02 |
| 2018/0374360 A1 | 12/2018 | Miao et al. | |

FOREIGN PATENT DOCUMENTS

| | | |
|---|---|---|
| KR | 20170082165 | 7/2017 |
| KR | 20180068511 | 6/2018 |
| KR | 20190013688 | 2/2019 |

* cited by examiner

FIG. 11

| FORM | TYPE | SENSING INFORMATION | MOVING DIRECTION | FORM | TYPE | SENSING INFORMATION | MOVING DIRECTION |
|---|---|---|---|---|---|---|---|
| ⌐ | ⌐ | 0 0 0 / 0 1 1 / 0 1 0 | R | ⊢ | ⊢ | 0 1 0 / 0 1 1 / 0 1 0 | R, F |
|  | ⌐ | 0 0 0 / 1 1 0 / 0 1 0 | L | ⊤ | ⊣ | 0 1 0 / 1 1 0 / 0 1 0 | L, F |
| + | + | 0 1 0 / 1 1 1 / 0 1 0 | L, R, F |  | ⊤ | 0 0 0 / 1 1 1 / 0 1 0 | L, R |

METHOD FOR GENERATING INTERSECTION POINT PATTERN RECOGNITION MODEL USING SENSOR DATA OF MOBILE ROBOT AND INTERSECTION POINT PATTERN RECOGNITION SYSTEM

TECHNICAL FIELD

This disclosure relates to a method for generating an intersection point pattern recognition model using sensor data of a mobile robot and an intersection point pattern recognition system and, more specifically, to a method for generating an intersection point pattern recognition model capable of movable controlling a mobile robot without installing a separate landmark, and an intersection point pattern recognition system.

BACKGROUND ART

Logistics means a logistics activity from inputting a product to a production process up to producing a finished product. In an industrial site for dealing with logistics, various types of raw materials such as raw materials, semi-processed product, work-in-process, product, etc., which are generated during a product production process, are managed since the raw materials may not be handed at once, and the complexity and difficulty are very high. Recently, an automated guided vehicle (AGV) becomes an important factor of a production system for automation of a logistics system.

However, in order to collect information on an absolute position of a space of the mobile robot, a landmark sensor is additionally required. Adding such a landmark sensor to an industrial site is not only a cost issue but also the usability is determined based on a site condition, so it is impossible to flexibly respond to a production process which is required by a smart plant. If there is a larger number of unmanned carriers in charge of logistics, there is a problem in that it is impossible to secure real time to follow a fast production process due to the size of the transmission data.

DISCLOSURE

Technical Problem

It is an object of the disclosure to address the above-mentioned problems, and provide an autonomous driving-based mobile robot control system capable of grasping the absolute position of a mobile robot using a pre-established usage environment, and a method for generating a moving route prediction model.

However, this task is exemplary, and the scope of the embodiment is not limited thereby.

Technical Solution

According to an embodiment, provided is an intersection point pattern recognition system using sensor data of a mobile robot including a mobile robot that autonomously drives by using sensor data received from a sensor unit and an intersection point pattern recognition model provided by a management server; and a management server that receives usage environment information of the mobile robot and generates the intersection point pattern recognition model of the mobile robot to provide the intersection pattern recognition model to the mobile robot, wherein the management server includes a map generation unit for receiving the usage environment information of the mobile robot and generating a route map of the mobile robot based on the usage environment information; a normalization unit for generating a virtual map by normalizing the route map according to a preset rule; and a learning unit for generating the intersection point pattern recognition model by using the virtual map and the sensor data of the mobile robot as learning data.

Effect of Invention

According to an embodiment of the disclosure as described above, by grasping a pattern of a route map by a pre-established guideline using a method for generating an intersection point pattern recognition model using sensor data of a mobile robot and an intersection point pattern recognition system, an absolute spatial position of a mobile robot may be recognized without a separate landmark sensor.

The scope of the disclosure is not limited by the effect.

DESCRIPTION OF DRAWINGS

FIG. 11 is a diagram illustrating a method of classifying feature patterns at an intersection point.

BEST MODE FOR CARRYING OUT THE INVENTION

Figure 1:
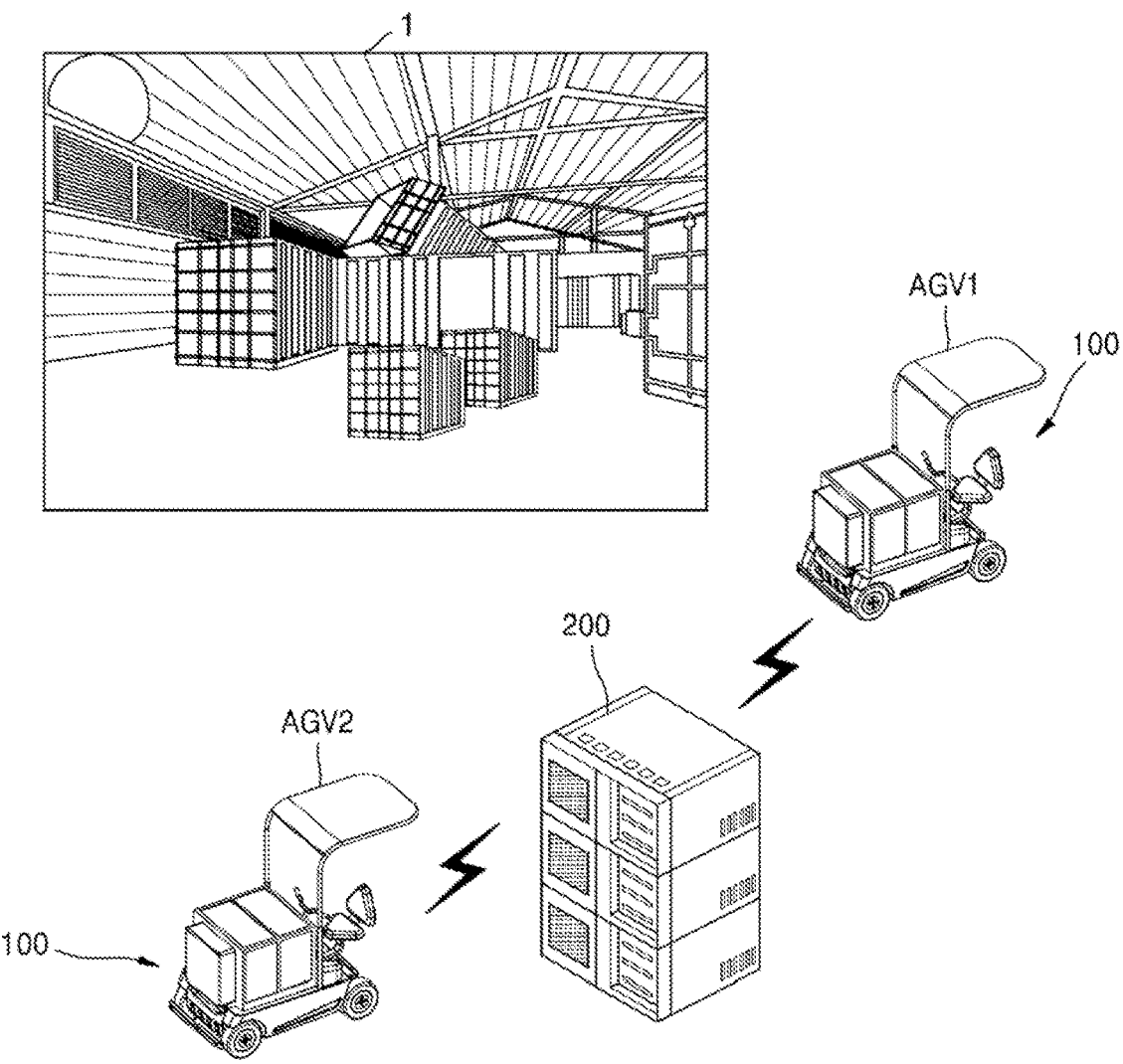
FIG. 1 schematically illustrates an intersection point pattern recognition system utilizing sensor data of a mobile robot according to an embodiment.

According to an embodiment, provided is an intersection point pattern recognition system using sensor data of a mobile robot including a mobile robot that autonomously drives by using sensor data received from a sensor unit and an intersection point pattern recognition model provided by a management server; and a management server that receives usage environment information of the mobile robot and generates the intersection point pattern recognition model of the mobile robot to provide the intersection pattern recognition model to the mobile robot, wherein the management server includes a map generation unit for receiving the usage environment information of the mobile robot and generating a route map of the mobile robot based on the usage environment information; a normalization unit for generating a virtual map by normalizing the route map according to a preset rule; and a learning unit for generating the intersection point pattern recognition model by using the virtual map and the sensor data of the mobile robot as learning data.

According to an embodiment, the mobile robot may include an input unit for receiving the intersection point pattern recognition model by communicating with the management server; and a control unit for controlling driving of the mobile robot using the sensor data and the intersection point pattern recognition model.

According to an embodiment, the usage environment information may be information about pre-established guideline or structures.

According to an embodiment, the route map may be made of a grid-shape map.

According to an embodiment, the normalization unit may generate a virtual map by normalizing the route map, so that a distance between the intersection points has an integer multiple of a unit length.

According to an embodiment, the learning unit may extract an intersection point pattern at an intersection point of the virtual map.

According to an embodiment, the learning unit may classify and extract the intersection point as "┐" (elbow) type, "┬" (three-way) type, and "+" (cross) type.

According to an embodiment, provided is a method of generating an intersection point pattern recognition model in a management server by generating an intersection point pattern recognition model of a mobile robot including a sensor unit and providing the model to the mobile robot includes receiving usage environment information of the mobile robot and sensor data of the sensor unit; generating a route map based on the usage environment information; generating a virtual map by normalizing the route map according to a preset rule; and generating the intersection point pattern recognition model by using the virtual map and the sensor data of the mobile robot as learning data.

According to an embodiment, the usage environment information may be information about pre-established guideline or structures.

According to an embodiment, the generating the intersection point pattern recognition model may include extracting an intersection point pattern at an intersection point of the virtual map.

According to an embodiment, the generating the intersection point pattern recognition model may include classifying and extracting the intersection point as "┐" (elbow) type, "┬" (three-way) type, and "+" (cross) type.

According to an embodiment, the route map may be made of a grid-shape map.

According to an embodiment, the generating the virtual map may include generating a virtual map by normalizing the route map, so that a distance between the intersection points has an integer multiple of a unit length.

According to an embodiment, a computer program stored in a medium to execute a method of any one of the above claims using a computer is provided.

Other aspects, features, and advantages other than those described above will become apparent from the specific details, claims, and drawings for practicing the invention below.

MODE FOR CARRYING OUT THE INVENTION

Various embodiments of the disclosure are described in connection with the accompanying drawings. Various embodiments of the disclosure may have various changes and may have various embodiments, and specific embodiments are illustrated in the drawings and are described in further detail. It should be understood, however, that this is not intended to limit the various embodiments of the disclosure to a particular embodiment, and should be understood to include all changes and/or equivalents to alternatives falling within the spirit and scope of the various embodiments of the disclosure. In connection with the description of the drawings, similar reference numerals have been used for similar components.

The expressions, such as "comprise" or "include," which may be used in various embodiments of the disclosure, indicate the presence of a corresponding function, operation, or component, which may be used, and does not limit additional one or more functions, operations, or components. It should also be understood that in various embodiments of the disclosure, the terms "comprise" or "include" are intended to specify the presence or addition of features, numbers, steps, operations, components, parts, or combinations thereof, as described herein, but do not preclude the presence or addition of one or more other features or numbers, steps, operations, components, components, or parts thereof.

In various embodiments, an expression such as "or" includes any and all combinations of words listed together. For example, the expression "A or B" may include A, B, or both A and B.

The expressions, such as "first," "second," used in various embodiments of the disclosure may modify various components of various embodiments, but do not limit the corresponding components. For example, the expressions do not limit the order and/or importance of the components. The expressions may be used to distinguish one component from another component. For example, both the first user device and the second user device are user equipment and represent different user devices. For example, a first component may be termed a second component without departing from the right's scope of the various embodiments of the disclosure, and similarly a second component may also be termed a first component.

It should be understood that when any of the components are "connected" or "coupled" to other components, it should be understood that any of the components may be directly connected to or coupled to the other component, but there may be a new other component between any of the components and the other components. On the other hand, when certain components are referred to as being "directly connected" or "directly coupled" to other components, it should be understood that there are no new other components between any of the components and the other components.

Terms used in the disclosure may be used to describe specific embodiments rather than restricting the scope of other embodiments. Singular forms are intended to include plural forms unless the context clearly indicates otherwise.

Unless otherwise specified, the terms used in the disclosure, including technical and scientific terms may have the same meanings as those that are generally understood by those skilled in the art to which the disclosure pertains.

Terms defined in a general dictionary among terms used in the disclosure may be interpreted as meanings that are the same as or similar to meanings within a context of the related art, and are not interpreted as ideal or excessively formal meanings unless clearly defined in the disclosure.

Figure 2:
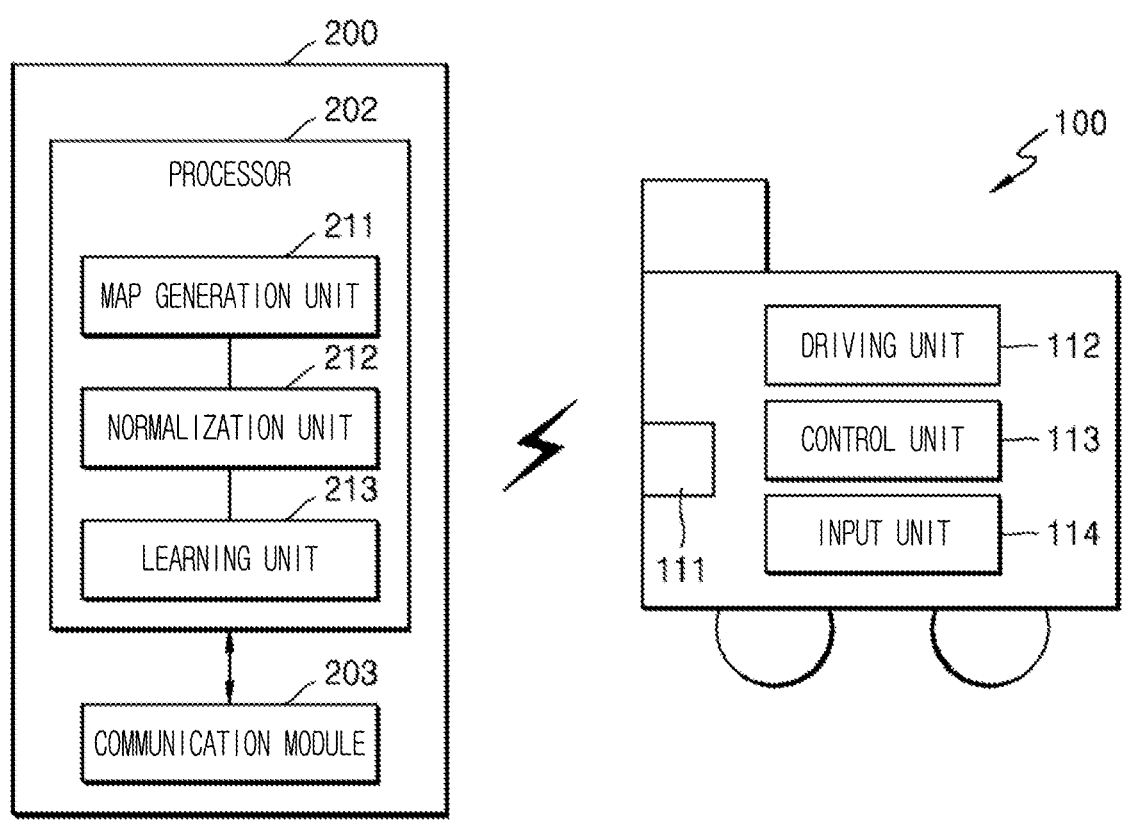
FIG. 2 is a block diagram illustrating a configuration of the mobile robot and the management server of FIG. 1.

FIG. 1 schematically illustrates an intersection point pattern recognition system 10 utilizing sensor data of a mobile robot according to an embodiment, and FIG. 2 is a block diagram illustrating a configuration of a mobile robot 100 and a management server 200 of FIG. 1.

In a system in which logistics is performed on the basis of autonomous driving, it is important to identify the exact location of each mobile robot for precise control of the mobile robot. In the related art, a guideline which a mobile robot in an industrial site 1 can detect is constructed, and a separate landmark is included in a specific position such as an intersection point where the mobile robot needs to change the moving direction so that an absolute position of the mobile robot is grasped. However, installing a separate landmark for each intersection point may increase cost and when a usage environment of the mobile robot is changed, the landmark needs to be installed again, causing a problem.

An intersection point pattern recognition system 10 according to an embodiment may detect an intersection point pattern and grasp an absolute position by using only sensor data of a mobile robot 100 obtained by sensing a pre-constructed guideline or a structure without installing a separate landmark. The intersection point pattern recognition system 10 may be implemented within a network environment. For example, the mobile robot 100 may communicate with a management server 200 through a network using a wireless or wired communication method. Also, as shown in the drawing, a plurality of mobile robots 100 may communicate with the management server 200, and a user terminal (not shown) for a user to manage the system may be further included.

The communication method is not limited, and a communication method utilizing a communication network (e.g., a mobile communication network, a wired Internet, a wireless Internet, a broadcasting network), and a near field wireless communication between devices may also be included. For example, the network may include one or more of a personal area network (PAN), a local area network (LAN), a campus area network (CAN), a metropolitan area network (MAN), a wide area network (WAN), a broadband network (BBN), and the like. Further, the network may include any one or more of a network topology including a bus network, a star network, a ring network, a mesh network, a star-bus network, a tree or a hierarchical network, and the like, but is not limited thereto.

Referring to FIGS. 1 and 2, the intersection point pattern recognition system 10 according to an embodiment may include the mobile robot 100 and the management serve 200.

The mobile robot 100 may function as an automated guide vehicle (AGV) used for logistics automation. The system 10 may include one or more mobile robots 100, each of which may be assigned a unique identifier (AGV1, AGV2). The mobile robot 100 may move by autonomous driving by recognizing the intersection point pattern using the sensor data obtained from the sensor unit 111 and the intersection point pattern recognition model provided from the management server 200, and then determining the proceeding direction of the next intersection point pattern. The mobile robot 100 may include a sensor unit 111, a driving unit 112, a control unit 113, and an input unit 114.

The sensor unit 111 is provided on one side of the mobile robot 100 to sense a pre-constructed guideline or structure and generate sensor data. In one embodiment, the sensor unit 111 may be a magnet sensor for sensing a guideline. The magnetic sensor may measure the magnitude or direction of the magnetic field or line of induction, and may be arranged on the mobile robot 100 at a predetermined distance from the guideline in consideration of the intensity of the magnetic signal or the type of the magnet sensor from the guideline.

Here, the guideline MP (see FIG. 3) may be formed of a magnetic material, such as a magnetic tape, on the bottom surface of the moving route through which the mobile robot 100 moves. The guideline MP may be formed in a continuous magnetic stripe form from a starting point to an ending point of the driving route, and the number, shape, width, etc. of the line of the guideline MP may be appropriately selected according to the design condition of the mobile robot 100. However, the embodiment is not limited thereto, and if necessary, the guideline MP may be installed on the ceiling surface instead of the bottom surface, and the sensor unit 111 may be disposed on the upper surface of the mobile robot 100 to detect the guideline MP.

As an alternative embodiment, the sensor unit 111 may further include a light emitting sensor and a light receiving sensor, an infrared (IR) sensor, and the like, which include a photo diode or a photo transistor. The sensor unit 111 may include a camera for sensing a built-in structure.

The driving unit 112 may include components for driving the mobile robot 100. The driving unit 112 may further include a driving motor for rotating the individual wheels operated by receiving the driving signal of the control unit 113, and a control unit 113 for controlling each wheel of the mobile robot 100 through the control unit 113, and may further include well-known components for driving the mobile robot 10.

The input unit 114 may perform a function of communicating with the management server 200. In one embodiment, the input unit 114 may be provided with an intersection point pattern recognition model from the management server 200. The input unit 114 may be provided with a moving route to a work point or a destination point, target intersection point pattern information, collision avoidance information, and the like, from the management server 200. The input unit 114 may perform a bi-directional communication function with the management server 200 to provide the moving information of the mobile robot 100 to the management server 200. In this case, the moving information of the mobile robot 100 may include unique identifiers (AGV1, AGV2), travel direction information, travel speed information, intersection point pattern information, spatial coordinate information (x,y), collision detection information, and the like, of the mobile robot 100. The information may be provided in both directions of the management server 200 and the mobile robot 100 by a communication protocol, and a detailed description thereof will be described later.

The control unit 113 may control the operation of the mobile robot 100 using sensor data and an intersection point pattern recognition model. The control unit 113 controls the entire process of operating the mobile robot 100 to automate the logistics, as a central processing unit. That is, when the shortest route from the management server 200 to the destination point or the work point is provided, the control unit 113 may recognize the intersection point pattern from the sensor data measured in real time or periodically using the intersection point pattern recognition model. The control unit 113 may determine the next proceeding direction at the intersection point by using the recognized intersection point and the moving direction of the mobile robot 100.

The management server 200 may receive the usage environment information of the mobile robot 100, generate an intersection point pattern recognition model of the mobile robot 100, and provide the generated model to the mobile robot 100. In this case, the usage environment information may be information on pre-established guidelines or structures. In other words, the usage environment information may be information about a work environment in which a logistics work is performed through the mobile robot 100, and may be information on a pre-constructed guideline or structure disposed on a route through which the mobile robot 100 moves. The management server 200 may include a processor 202 and a communication module 203. In addition, the management server 200 may further include known configurations for computer program processing, for example, a memory, an input/output interface, etc.

The processor 202 may be configured to process instructions of a computer program by performing basic arithmetic, logic, and input/output operations. Here, the "processor" may refer to a data processing device embedded in hardware, which has a physically structured circuit to perform a function represented by a code or a command included in a program. As an example of the data processing apparatus embedded in the hardware, a processing apparatus such as a microprocessor, a central processing unit (CPU), a processor core, a multiprocessor, an Application-Specific Integrated Circuit (ASIC), and a Field Programmable Gate Array (FPGA) may be used, but the scope is not limited thereto. Instructions may be provided to the processor 202 by a memory (not shown) or a communication module 203. For example, the processor 202 may be configured to execute instructions received according to a program code stored in a recording device, such as a memory (not shown). The processor 202 may include a map generation unit 211, a normalization unit 212, and a learning unit 213.

The communication module 203 may provide a function for communicating between the mobile robot 100 and the management server 200 through a network. In addition, a function for communicating with another server may be provided. For example, the request generated by the control unit 113 of the mobile robot 100 according to a program code stored in a recording device such as a memory may be transmitted to the management server 200 through a network according to the control of the communication module. Conversely, control signals, commands, contents, files, etc. provided under the control of the processor 202 of the management server 200 may be received by the mobile robot 100 through the communication module 203 and the input unit 114, which is a communication module of the mobile robot 100 via the network. For example, the control signal or command of the management server 200 received through the communication module 203 may be transferred to the processor or memory.

Hereinafter, referring to FIG. 3, the communication protocol of the intersection point pattern recognition system 10 according to one embodiment will be described.

Figure 3:
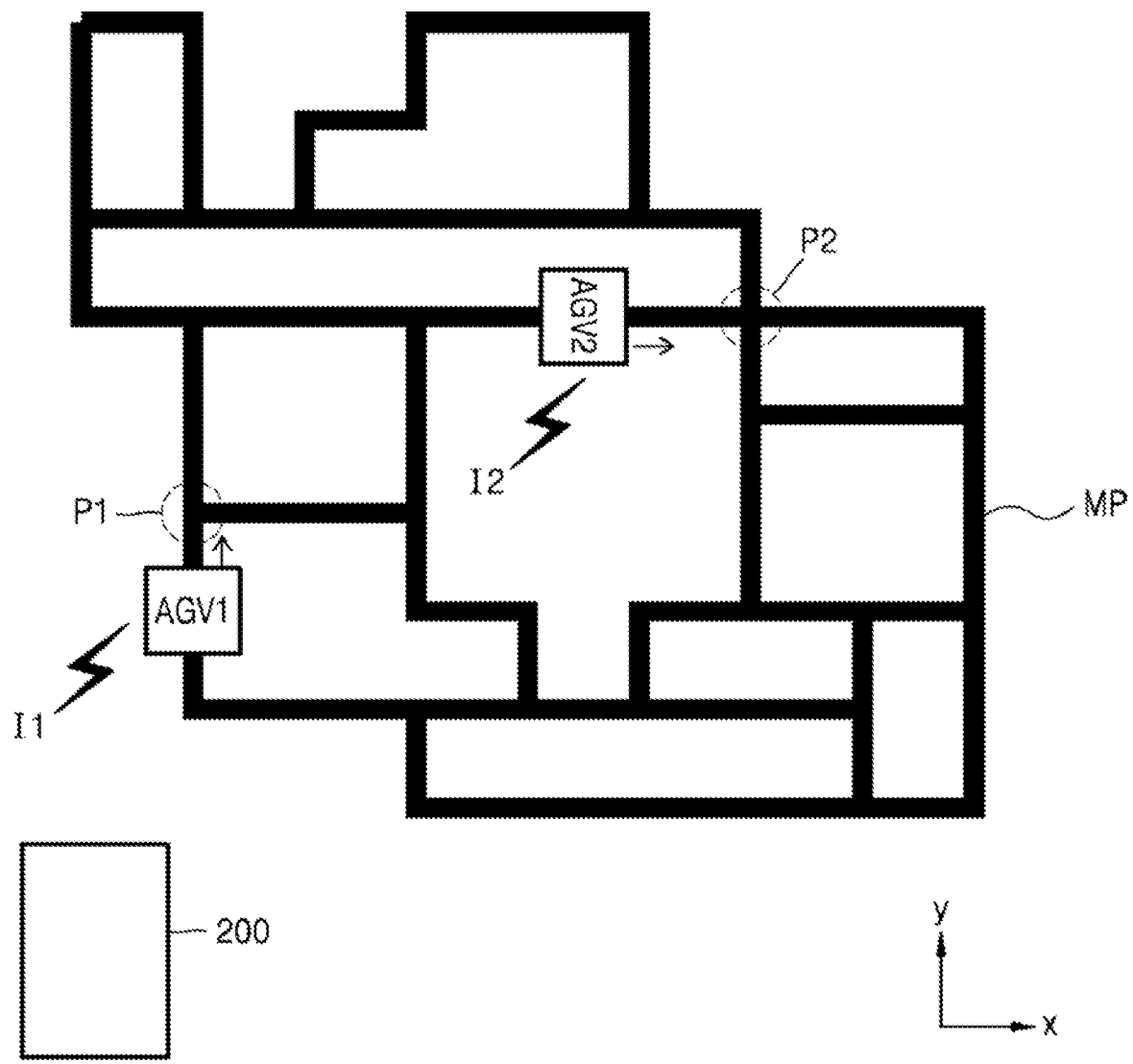
FIG. 3 is a diagram illustrating a communication protocol between the mobile robot and the management server of FIG. 1.

FIG. 3 is a view for describing the communication protocol with the mobile robot 100 and the management server 200 of FIG. 1, and Table 1 is a table indicating the communication protocol information.

I1 or the second information I2 including the unique identifiers AGV1, AGV2, travel direction information, travel speed information, intersection point pattern information, spatial coordinate information (x,y), collision detection information, and the like, of the mobile robot 100. The moving direction information is information necessary for determining the direction of travel of the mobile robot 100, that is, the direction for moving from the current intersection point to the next intersection point, and the driving speed information may be the target moving speed required between the intersection point and the intersection point. The intersection point identifier may be a unique value capable of distinguishing each intersection point, for example, the first intersection point P1 and the second intersection point P2 in the drawing may be divided into different eigenvalues. The spatial coordinate information may be information indicating a location on a map of the mobile robot 100. The collision avoidance direction information may be information for determining the avoidance direction of the mobile robot having a low priority when the collision is detected, and the collision detection signal information may be a detection signal for a collision alarm in the course of an intersection point when a plurality of mobile robots move.

TABLE 1

| Starting information | Identifier | Instruction | | | | | | | Ending information |
|---|---|---|---|---|---|---|---|---|---|
| Communication protocol start | Intrinsic information | Intersection pattern | Moving direction | Moving speed | Intersection identifier | Coordinate X  Y | Collision evasion direction | Collision detection signal | Communication protocol end |

Referring to Table 1 and FIG. 3, the intersection point pattern recognition system 10 according to an embodiment may include a plurality of mobile robots 100 in an environment where logistics are processed. At this time, the mobile robots 100 are given unique identifiers AGV1 and AGV2. More specifically, the intersection point pattern recognition system 10 starts communication with the mobile robot 100 divided by the unique identifiers AGV1 and AGV2 when the start information (protocol header) indicating the start of the communication is provided. For example, the management server 200 may generate the shortest route from the first mobile robot AGV1 or the second mobile robot AGV2 to a target point or a work point to provide a moving route.

The moving route may be generated by connecting the intersection point and the intersection point, and the first mobile robot AGV1 or the second mobile robot AGV2 may be provided with target intersection point pattern information to be processed while moving along the moving route provided from the management server 200. The management server 200 may provide an intersection point pattern recognition model to the mobile robot 100, and the mobile robot 100 may recognize the intersection point pattern of the mobile robot 100 using the sensor data and the intersection point pattern recognition model. For example, in the drawing, the first mobile robot AGV1 may detect a guideline using the sensor unit 111 while moving in the first direction (y direction), and when sensor data at the first intersection point P1 is obtained, it is recognized that the first intersection point P1 may be a " ┬ " (three-way) pattern using an intersection point pattern recognition model.

As described above, the first mobile robot AGV 1 or the second mobile robot AGV2 may communicate with the management server 200 with respect to the first information The mobile robot 100 may move to a destination point or a work point in a use environment while transmitting or receiving information by the communication protocol, and the intersection point pattern recognition system 10 may generate an end information (protocol end) indicating the end of the communication.

Hereinafter, with reference to the drawings, the intersection point pattern recognition model generation method according to one embodiment will be described in detail.

Figure 4:
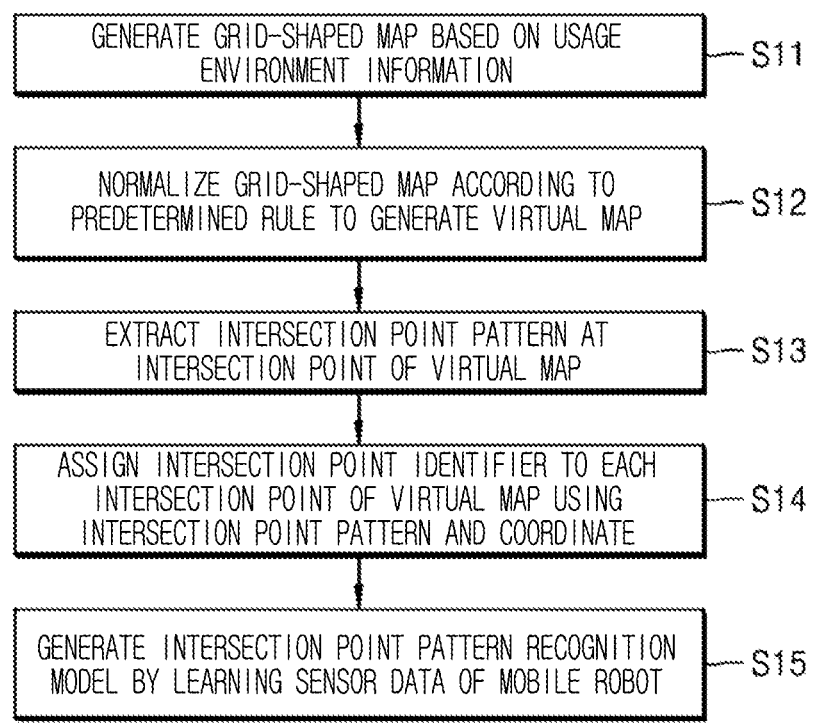
FIG. 4 sequentially illustrates a method of generating an intersection point pattern recognition model in a management server according to an embodiment.
Figure 5:
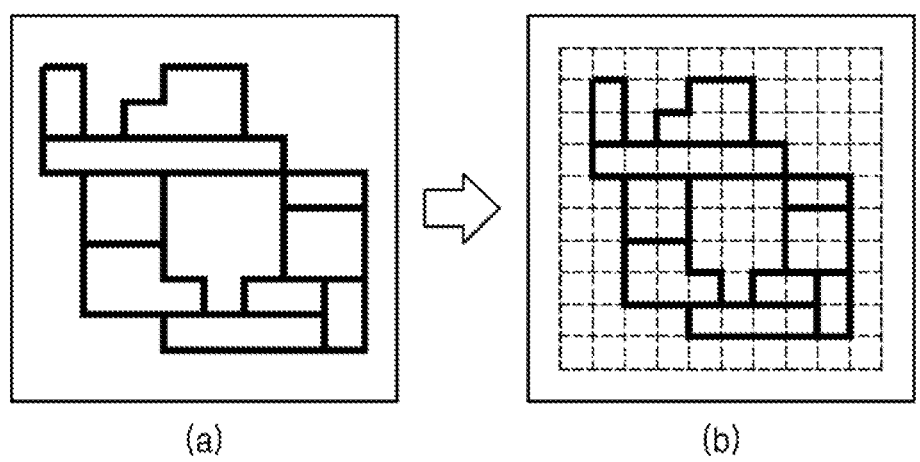
FIGS. 5 and 6 are views illustrating a process of generating a grid map using the usage environment information.
Figure 6:
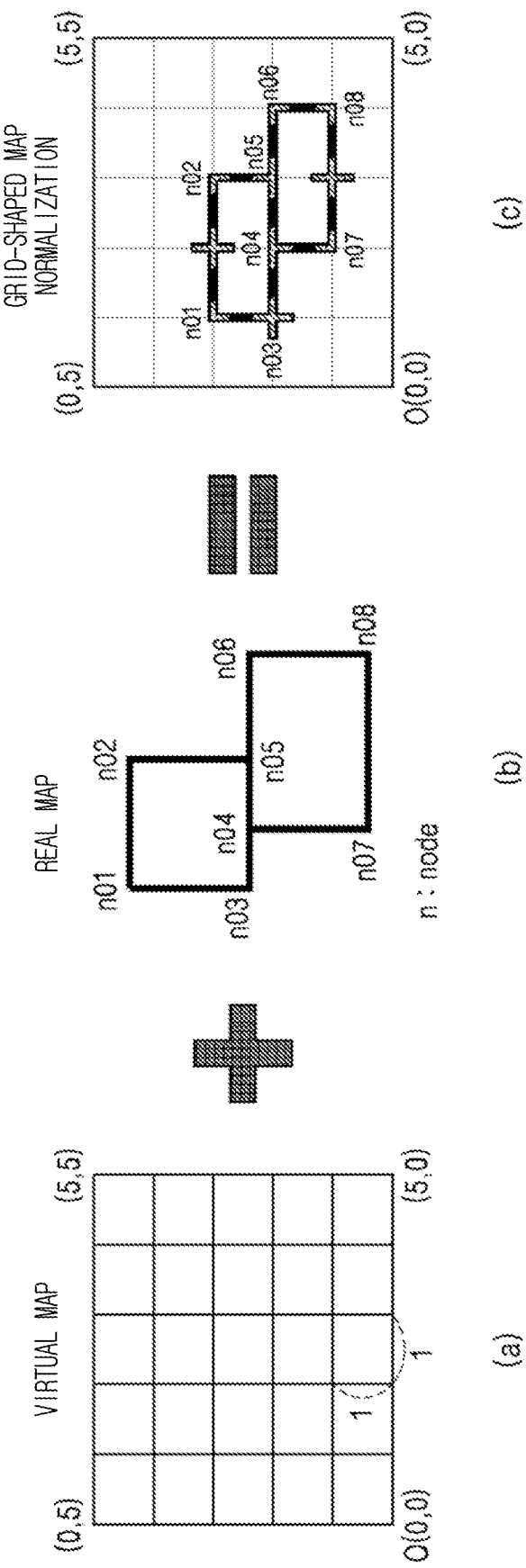
Figure 7:
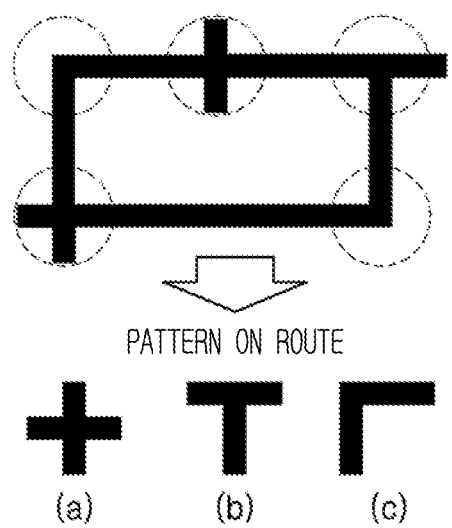
FIGS. 7 and 8 are views illustrating a method of extracting an intersection point pattern at an intersection point.
Figure 8:
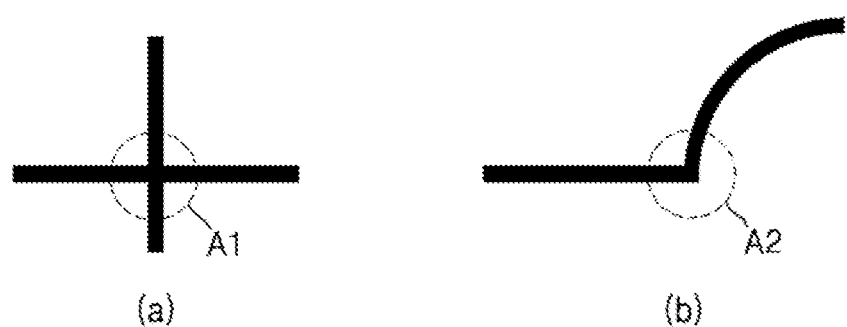
Figure 9:
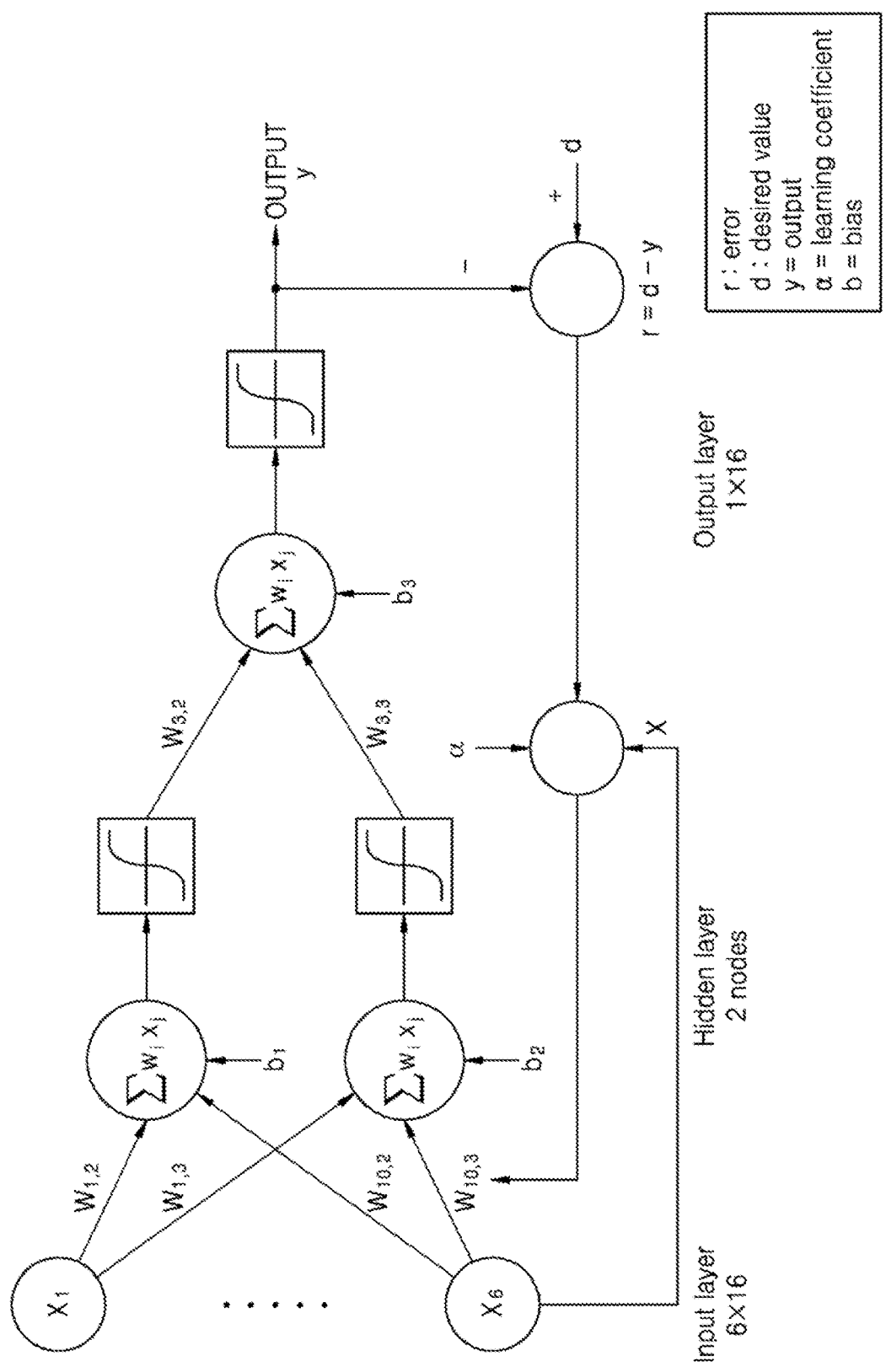
FIG. 9 schematically illustrates a process of generating an intersection point pattern recognition model in a learning unit.

FIG. 4 sequentially illustrates a method of generating an intersection point pattern recognition model in the management server 200 according to an embodiment, and FIGS. 5 and 6 are views illustrating a process of generating a grid map using the usage environment information. FIGS. 7 and 8 are views illustrating a method of extracting an intersection point pattern at an intersection point, and FIG. 9 schematically illustrates a process of generating an intersection point pattern recognition model in the learning unit 213.

Referring back to FIGS. 2 and 4 through 9, the management server 200 may generate a virtual map from the use environment information, generate an intersection point pattern recognition model by using the sensor data of the mobile robot 100, and include a map generation unit 211, a normalization unit 212, and a learning unit 213 to perform the following process.

The map generation unit 211 may receive the usage environment information of the mobile robot 100 and generate a route map based on the usage environment information in S11. In this case, the usage environment information may be information on pre-established guidelines or structures. In other words, the usage environment information may be information about a work environment in which a logistics work is performed through the mobile robot 100, and may be information on a pre-constructed guideline or structure disposed on a route through which the mobile robot 100 moves. The map generating unit 211 may receive the use environment information and generate a route through which the mobile robot 100 may move. Here, the route may appear in a straight line as shown in FIG. 8A, and may appear in a curved shape as shown in FIG. 8B. The route map may be formed in any form, but will be described below with reference to the case where the route map is composed of a grid-shaped map for convenience.

Here, since the grid-type map reflects the actual usage environment, the actual length information may be included, as shown in FIG. 5A. However, since the technical idea of the disclosure is to generate the intersection point pattern recognition model of the mobile robot 100 by using the intersection point pattern at the intersection point on the grid-shaped map, it is possible to convert the grid-shaped map as shown in FIG. 5B so that the characteristics of the intersection point may be emphasized. Referring to FIG. 8, the usage environment information may have an intersection point where at least two guidelines cross each other, and may be formed in a straight line, as shown in FIG. 8A, and may be formed in a curved line as shown in FIG. 8B.

More specifically, referring to FIG. 6, a normalization unit 212 normalizes the grid-shaped map according to a predetermined rule to generate a virtual map in S12. As described above, since the feature pattern of the intersection point needs to be extracted from the virtual map, an actual map should be converted according to a predetermined rule so that the feature pattern of the intersection point may be emphasized, and as shown in FIG. 6A, the basis for generating the virtual map may be composed of unit regions having the same length of width and height. As shown in FIG. 6B, in the actual map, the distance between intersection points may be different according to the actual working environment, but the virtual map may be arranged in a predetermined rule on the unit regions. As an example, the normalization unit 212 may generate a virtual map by normalizing the grid-shaped map so that the distance between the intersection points has an integer multiple of a unit length (see FIG. 6C). For example, the distance between a first intersection point n01 and a second intersection point n02 in the actual map is closer than the distance between the seventh intersection point n07 and the eighth intersection point n08, but in the virtual map, the distance between the first intersection point n01 and the second intersection point n02 and the distance between the seventh intersection point n07 and the eighth intersection point n08 may be equal. For example, the position of the fourth intersection point n04 in the actual map is closer to the third intersection point n03 than the fifth intersection point n05, and the position of the fourth intersection point n04 in the virtual map may be disposed in the middle of the third intersection point n03 and the fifth intersection point n05.

The learning unit 213 generates an intersection point pattern recognition model using the virtual map and the sensor data of the mobile robot 100 as learning data. First, the learning unit 213 may extract the intersection point pattern at the intersection point of the virtual map in S13. As an example, the learning unit 213 may classify the intersection point pattern into " ⌐ " (elbow) type (FIG. 7C), " ⊤ " (a three-way type) (FIG. 7B), and "+" (cross) type (FIG. 7A). More specifically, with reference to FIG. 11, the intersection point of the virtual map may be classified into six types of intersection patterns. The six kinds of crossing patterns, even in the same type, may be classified into six types according to the proceeding direction when the mobile robot 100 enters the corresponding intersection point, and may be extracted with three types of feature patterns through the form of six types of intersection patterns.

The intersection point pattern may be extracted from the intersection area (A1, A2) formed by at least two induction lines intersecting. At this time, since the guideline is possible in both a straight form or a curved form as described above, and may appear as FIG. 8A or FIG. 8B, but in the intersection area (A1, A2), the intersection point pattern that intersects in a straight line form in accordance with the area size may be extracted. At this time, the learning unit 213 may extract a vertical pattern from the intersection point, but is not necessarily limited to this, and it is also able to extract the intersection point pattern even if the angle is other than the vertical. The learning unit 213 may be given a unique intersection point identifier to each intersection point of the virtual map using the intersection point pattern and coordinate information in S14.

The learning unit 213 generates an intersection point pattern recognition model of the mobile robot 100 with the sensor data of the virtual map and the mobile robot 100, including the extracted section point pattern as the learning data in S15. The learning unit 213 may generate an intersection point pattern classification criteria based on the intersection point pattern, and generate an intersection point pattern recognition model based on the classification criteria and sensor data. The learning unit 213 may learn an intersection point pattern recognition model based on machine learning, and the machine learning is defined as a set of algorithms that attempt to high level abstraction (a work of summarizing a key content or function from large amount of data or complex data) through a combination of various nonlinear transformation techniques.

Referring to FIG. 9, the learning unit 123 may generate a moving route prediction model by selecting a weight of a pattern with a multi-layer perceptron, which is a neural network learning method composed of an input layer, a hidden layer, and an output layer. However, the embodiment is not limited thereto, and it is understood that a machine learning model may be used, for example, deep neural networks (DNN), convolutional neural networks (CNN), recurrent neural networks (RNN), deep belief networks (DBN), and the like.

The management server 200 may provide the intersection point pattern recognition model generated through the above-described process to the mobile robot 100. When the shortest route according to the destination point or the working point is provided, the mobile robot 100 may recognize the intersection point pattern by using the intersection point pattern recognition model and the sensor data, and then determine the proceeding direction and move to the destination point or the work point.

Figure 10:
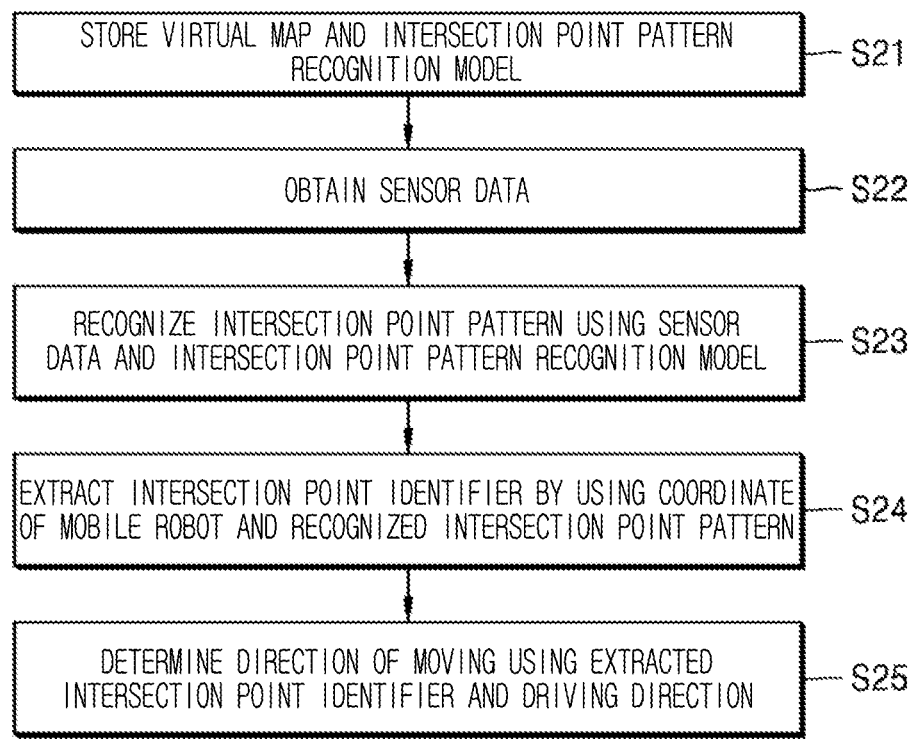
FIG. 10 is a view sequentially illustrating a process of moving through intersection point pattern recognition in a mobile robot.

FIG. 10 is a view sequentially illustrating a process of moving through intersection point pattern recognition in the mobile robot 100; and FIG. 11 is a diagram illustrating a method of classifying feature patterns at an intersection point.

The mobile robot 100 may receive and store a virtual map and an intersection point pattern recognition model generated by the management server 200 in S21. The intersection point pattern recognition model above may be periodically trained by the management server 200 and provided again to the mobile robot 100.

In operation S22, the mobile robot 100 may obtain sensor data by using the sensor unit 111 when the moving route to the destination point or the work point is determined. At this time, the mobile robot 100 may provide the obtained sensor data to the management server 200 periodically or when an event occurs. The sensor data obtained from the sensor unit 111 may be data having a small size, for example, 16 bits, and the plurality of mobile robots 100 may process data in real time.

The mobile robot 100 recognizes the intersection point pattern of the mobile robot 100 using the sensor data and the intersection point pattern recognition model in S23. As shown in FIG. 11, the intersection point pattern may be any one of three types, i.e., "⌐" (elbow) type, "⊤" (a three-way) type, and "+" (cross) type, and the mobile robot 100 may recognize in real time which pattern is a pattern sensed through a trained intersection point pattern recognition model. At this time, if the management server 200 assigns an identifier to each of the intersection points on the virtual map, the mobile robot 100 may extract an identifier of the sensed intersection point pattern from an intersection point pattern recognition model including the identifier.

The mobile robot 100 may determine the proceeding direction of the corresponding intersection point by using an intersection point pattern or an extracted intersection point identifier and a moving route from a moving direction and a destination point of the mobile robot 100 in S25. For example, in the case where the destination point of the first mobile robot AGV1 of FIG. 3 is up to the second intersection point P2, the first mobile robot AGV1 may recognize the first intersection point P1 in a "⊤" (three-way) pattern by using the sensor data and the intersection point pattern recognition model while moving in the first direction (y direction). In the intersection point pattern in the form of "T", the first direction (y direction) is entered, so to move to the second intersection point P2, moving straight in the first direction (y direction) or changing the direction in the second direction (direction) to advance the direction from the first intersection point P1, where the first mobile robot AGV1 may determine any one of the two moving directions according to the moving route, which is the shortest route provided from the management server 200.

As described above, the intersection point pattern recognition system using the sensor data of the mobile robot and the method for generating the intersection point pattern recognition model using the sensor data of the mobile robot according to embodiments may recognize the pattern of the route map by only the pre-constructed guideline detection, thereby recognizing the absolute position of the mobile robot without installing a separate landmark sensor. The method for generating a moving route prediction model according to embodiments may be expanded to landmark recognition attached to various areas such as a ceiling, a wall, works, and the like, as well as a guideline detection, and may be applied to fully autonomous driving by generating a real-time map of the mobile robot.

The intersection point pattern recognition system utilizing the sensor data of the mobile robot according to embodiments may be utilized in the control system through human-robot or robot-robot collaboration and server in a complex environment by enabling real-time data processing of a number of mobile robots, and may be utilized in the construction of various types of systematic smart logistics system with high efficiency, low cost expectations by simplifying the mobile robot system structure and use environment settings in the logistics industry.

The embodiments according to an embodiment described above may be implemented in the form of a computer program that may be executed through various components on a computer, and such computer programs may be recorded on a computer-readable medium. The medium may store computer-executable programs. Examples of the medium may include a magnetic medium such as a hard disk, a floppy disk, and a magnetic tape; an optical medium such as a compact disk read only memory (CD-ROM) or a digital versatile disk (DVD); a magneto-optical medium such as a floptical disk; and a device configured to store program commands, such as a read-only memory (ROM), a random access memory (RAM), a flash memory, or the like, so that a program instruction may be stored therein.

The computer program may be specially designed and configured for the embodiment, or may be known to those of ordinary skill in the art of computer software. Examples of computer programs may also include machine code, such as those created by a compiler, as well as higher language codes that may be executed by a computer using an interpreter or the like.

The specific implementations described herein are examples and are not intended to limit the scope of the disclosure. For the sake of brevity, conventional electronic configurations, control systems, software, other functional aspects of the systems may be omitted. Further, the connection or connection members of the lines between the components shown in the figure illustratively show functional connections and/or physical or circuit connections, which may be replaceable in an actual device or represented as additional various functional connections, physical connections, or circuit connections. Further, unless specifically disclosed like "essential," "important," etc., the components may not be necessary for the application of the disclosure.

While the disclosure has been described with reference to the exemplary embodiments shown in the drawings, it will be understood by those of ordinary skill in the art that various changes in form and details may be made therein without departing from the spirit and scope of the disclosure. Accordingly, the true technical scope of the disclosure should be defined by the technical spirit of the appended claims.

INDUSTRIAL APPLICABILITY

According to an embodiment, an intersection point pattern recognition system utilizing sensor data of a mobile robot is provided. In addition, embodiments of the disclosure may be applied to the pattern recognition technology of the mobile robot used in the industry.

What is claimed is:

1. An intersection point pattern recognition system, comprising:
   a mobile robot that autonomously drives by using sensor data received from a sensor unit and an intersection point pattern recognition model provided by a management server; and
   a management server that receives usage environment information of the mobile robot and generates the intersection point pattern recognition model of the mobile robot to provide the intersection pattern recognition model to the mobile robot,
   wherein the management server comprises a processor that:
      receives the usage environment information of the mobile robot and generates a route map of the mobile robot based on the usage environment information;
      generates a virtual map by normalizing the route map according to a preset rule; and generates the intersection point pattern recognition model by using the virtual map and the sensor data of the mobile robot as learning data, wherein the route map is made of a grid-shape map, and wherein the processor generates the virtual map by normalizing the route map, so that a distance between intersection points has an integer multiple of a unit length.

2. The system of claim 1, wherein the mobile robot:

receives the intersection point pattern recognition model by communicating with the management server; and controls driving of the mobile robot using the sensor data and the intersection point pattern recognition model.

3. The system of claim 1, wherein the usage environment information is information about pre-established guideline or structures.

4. The system of claim 1, wherein the processor extracts an intersection point pattern at an intersection point of the virtual map.

5. The system of claim 4, wherein the processor classifies and extracts the intersection point as an elbow type, a three-way type, and a cross type.

6. A method of generating an intersection point pattern recognition model in a management server by generating the intersection point pattern recognition model of a mobile robot including a sensor unit and providing the model to the mobile robot, the method comprising:

receiving usage environment information of the mobile robot and sensor data of the sensor unit;

generating a route map based on the usage environment information;

generating a virtual map by normalizing the route map according to a preset rule; and generating the intersection point pattern recognition model by using the virtual map and the sensor data of the mobile robot as learning data, wherein the route map is made of a grid-shape map, and wherein the generating the virtual map comprises generating the virtual map by normalizing the route map, so that a distance between intersection points has an integer multiple of a unit length.

7. The method of claim 6, wherein the usage environment information is information about pre-established guideline or structures.

8. The method of claim 6, wherein the generating the intersection point pattern recognition model comprises extracting an intersection point pattern at an intersection point of the virtual map.

9. The method of claim 8, wherein the generating the intersection point pattern recognition model comprises classifying and extracting the intersection point as an elbow type, a three-way type, and a cross type.

10. A non-transitory computer-readable medium that stores a computer program to execute the method of any one of claims 6 to 9 using a computer.

* * * * *